April 26, 1966   H. D. GREGORY, SR., ETAL   3,247,984
VEHICLE BODY FOR MATERIALS HANDLING
Filed Oct. 3, 1963   9 Sheets-Sheet 1

INVENTORS
HARRY D. GREGORY, Sr.
ERIC S. KING
BY
*Patrick & Henry*
ATTORNEYS.

April 26, 1966   H. D. GREGORY, SR., ETAL   3,247,984
VEHICLE BODY FOR MATERIALS HANDLING
Filed Oct. 3, 1963   9 Sheets-Sheet 2

INVENTORS:
HARRY D. GREGORY, Sr.
ERIC S. KING
BY
*Patrick d Henry*
ATTORNEYS

FIG. 3

April 26, 1966  H. D. GREGORY, SR., ETAL  3,247,984

VEHICLE BODY FOR MATERIALS HANDLING

Filed Oct. 3, 1963  9 Sheets-Sheet 4

INVENTORS
HARRY D. GREGORY, Sr.
ERIC S. KING
BY
ATTORNEYS.

April 26, 1966     H. D. GREGORY, SR., ETAL     3,247,984
VEHICLE BODY FOR MATERIALS HANDLING
Filed Oct. 3, 1963     9 Sheets-Sheet 7

INVENTORS:
HARRY D. GREGORY, Sr.
ERIC S. KING
BY
ATTORNEYS.

INVENTORS:
HARRY D. GREGORY, Sr.
BY ERIC S. KING

ATTORNEYS

April 26, 1966    H. D. GREGORY, SR., ET AL    3,247,984
VEHICLE BODY FOR MATERIALS HANDLING Filed Oct. 3, 1963                      9 Sheets-Sheet 9

INVENTORS:
HARRY D. GREGORY, SR.
ERIC S. KING
BY

ATTORNEYS

United States Patent Office

3,247,984
Patented Apr. 26, 1966

3,247,984
VEHICLE BODY FOR MATERIALS HANDLING
Harry D. Gregory, Sr., De Kalb County, Ga. (1373 Sheffield Drive NE., Atlanta, Ga.), and Eric S. King, De Kalb County, Ga. (1368 Sheffield Drive NE., Atlanta, Ga.)
Filed Oct. 3, 1963, Ser. No. 313,496
8 Claims. (Cl. 214—82)

This invention relates to vehicle bodies for materials handling and particularly to the construction and arrangement of the materials handling means mounted for relative motion on a vehicle body for either compressing a load or for expulsing a load from the body as when unloading dirt or other materials. In one form of the invention the vehicle body is open and the materials handling means is hydraulically operated to slide longitudinally of the body to unload dirt or other materials therefrom. Another form of the invention, the body is closed and a materials handling member is mounted for hydraulic operation to compress a load within the body. In both forms the materials handling member may be semi-circular or circular.

One of the largest cost factors if not the very largest cost factor in materials handling of large bulk loads such as hauling dirt for construction projects or hauling compressible loads such as garbage is the cost of operating the vehicle from one location to another including the delay time involved at both ends if a straight trip is made as well as the size of the load either as to weight or cubic measurement each trip. Large construction machines such as dirt shovels and tractor-type dirt hauling vehicles are capable of loading large cubic volume of loads but at the present time the capacity of the vehicles is seriously limited. Since many of these vehicles depend upon inclining the load in order to unload or upon partially inclining the load and perhaps separating the body, the capacity is limited as to the mechanism for lifting such heavy weights. In addition, there is the problem of the maneuverability and size of the carrying vehicle with respect to the terrain and geography of both the construction side and the unloading site. There is a great demand for a materials handling vehicle body which will handle large capacities of materials and which is provided with an easy way to remove the load from the body. There is also a demand for a packer unit which can be used to pack compressible materials into a body and then be used for unloading same.

Generally described, the present materials handling vehicle body arrangement in one form, without restriction on the scope of the invention as contained in the claims, employs a semi-circular gate or materials handling member adapted to be mounted on longitudinal frame members which may form the longitudinal chassis members of a vehicle body having round support wheels on any type of tandem or other wheel support arrangement which does not form a part of the present invention. The materials handling member or ejection gate is braced with transverse structural members carrying rollers on each end thereof which are mounted on H beams extending from each side of the shell of the body to receive rollers in the top channel thereof and rollers in the bottom channels thereof. Pairs of such transverse members are spaced vertically and are provided with end rollers mounted on vertical shafts to roll against the inner face of the top of the H member. An I beam is located substantially longitudinally and centrally of the vehicle chassis and forms the bottom track on which the ejection gate is mounted by means of pairs of spaced rollers having transverse shafts mounted on structural channels. The ejection gate by the foregoing structural mounting is capable of being extended from a position at the front end of the vehicle body to a position moved longitudinally on the support rollers to the rear end of the body by such power as delivered from a hydraulic, telescopic cylinder arrangement as to forcibly eject the load contained within the body.

In another embodiment of the invention, the vehicle body is formed in a complete cylindrical formation with cylindrical steel plates and the same or similar roller support arrangement is used as in the previous embodiment except that the ejection gate is cylindrical in formation and has an additional vertical, structural reinforcement of steel channel extending vertically to the top of the vehicle body shell which is provided with an inverted T-shaped beam running completely longitudinally thereof on which is mounted a roller set mounted on transverse axles or shafts attached by structural members to the gate. Suitable reinforcing rods or struts are attached at their respective ends in a parallelogram arrangement between the four sets of rollers supporting the gate on the body thereby adding structural rigidity and reinforcement. In the operation of the closed-body type described in this paragraph, a hydraulic, telescopic piston and cylinder arrangement has the outward end of the piston rod attached to the gate and the inner end attached to the vehicle frame. The cylindrical body would have a closed tail-gate on the rear end thereof against which compressible material such as garbage would be pushed by means of the circular gate. In the operation of the device from an unloaded to a loaded condition, garbage or other materials loaded into the cylindrical shape body as by means of a loading gate located on top of the cylindrical body, is constantly pushed by intermittent operation of the circular gate thereby compressing the load to its smallest volume against the tail-gate until the entire volume of the cylindrical body has been filled. Upon reaching the dump site, which may be one of the large, modern incinerators, the tail-gate is opened and the circular ejection gate is operated from the front to the rear to rapidly eject the entire load into the incinerator pit.

An object of the present invention is to provide a materials handling vehicle body employing an ejection gate which is operable substantially longitudinally from front to rear on said body for the purpose of ejecting the load of material therefrom.

Another object of the present invention in one form thereof is to provide a closed, cylindrical vehicle body for handling materials in which is mounted a circular ejection gate serving also as a compression member for compressing the load and having as as object the reduction of volume and the ultimate complete and rapid expulsion of the load upon reaching the dump site.

Another object of the present invention is to provide an ejection gate arrangement in a materials handling vehicle body wherein the structural frame members which support the ejection gate for sufficient structural strength also provide part of the longitudinal and transverse chassis frame member of the dump body thereby reducing the cost of the vehicle chassis itself.

Another object of the present invention is to provide a materials handling vehicle body employing a light-weight, structurally sound ejection gate which may be constructed of minimum weight and supported by structural members forming part of the chassis of the vehicle thereby reducing the overall tare weight therefore allowing more pay load in said vehicle.

It is to be understood that while in one form a semi-circular gate and vehicle body is shown and in another form a completely circular body and gate is shown and described, this is for purpose of illustration only as other shapes such as elliptical or even rectangular may be employed utilizing the same type of construction.

Some of the additional advantages of the present arrangement may be summarized as follows:

(1) The hazard present in most dump bodies carrying large loads of turning over from an abnormal change in the center of gravity has been reduced.

(2) The sub-frame or additional chassis construction of the body has been eliminated thereby saving in weight as well as cost of construction of the vehicle itself.

(3) The device is so arranged as to be capable of ejection on uneven ground, uphill as well as downhill.

(4) The body is self-cleaning and eliminates substantially all of the load each time thereby reducing the maintenance.

(5) The ejection of the material from the rear of the body may be so controlled by the operation of the gate as to spread the material or dump in a particular pattern thereby providing a type of filling spreader hopper which may be used for asphalt or base work.

(6) The device is such in overall height as to be usable in areas where head room is normally insufficient.

(7) The construction of the device reduces the overall tare weight thereby allowing more pay load.

(8) The arrangement of the hydraulic actuating mechanism being mountable through the front cab permits more front axle load thereby increasing more pay loads per axle.

(9) The arrangement allows a body construction on a modular basis conforming to bridge formulas of specific states.

Other and further objects and advantages of my invention may become apparent upon reading the following specification taken in conjunction with the accompanying drawings, in which:

FIG. 3 is a side elevation view taken substantially along lines 3—3 in FIG. 1.

Referring first to the embodiment shown in FIGS. 1 through 5 which is of the open body type adapted primarily to eject loads such as dirt or construction materials rather than to compress same and/or eject, the vehicle body is designated generally by the letter B which does not include and which does not form as a part of this invention the lower sub-frame of the vehicle chassis including the axle mounting which may be tandem or otherwise and which may employ any suitable spring arrangement for supporting heavy loads of upwards of 50 tons to be transported across rough terrain.

Figure 1:
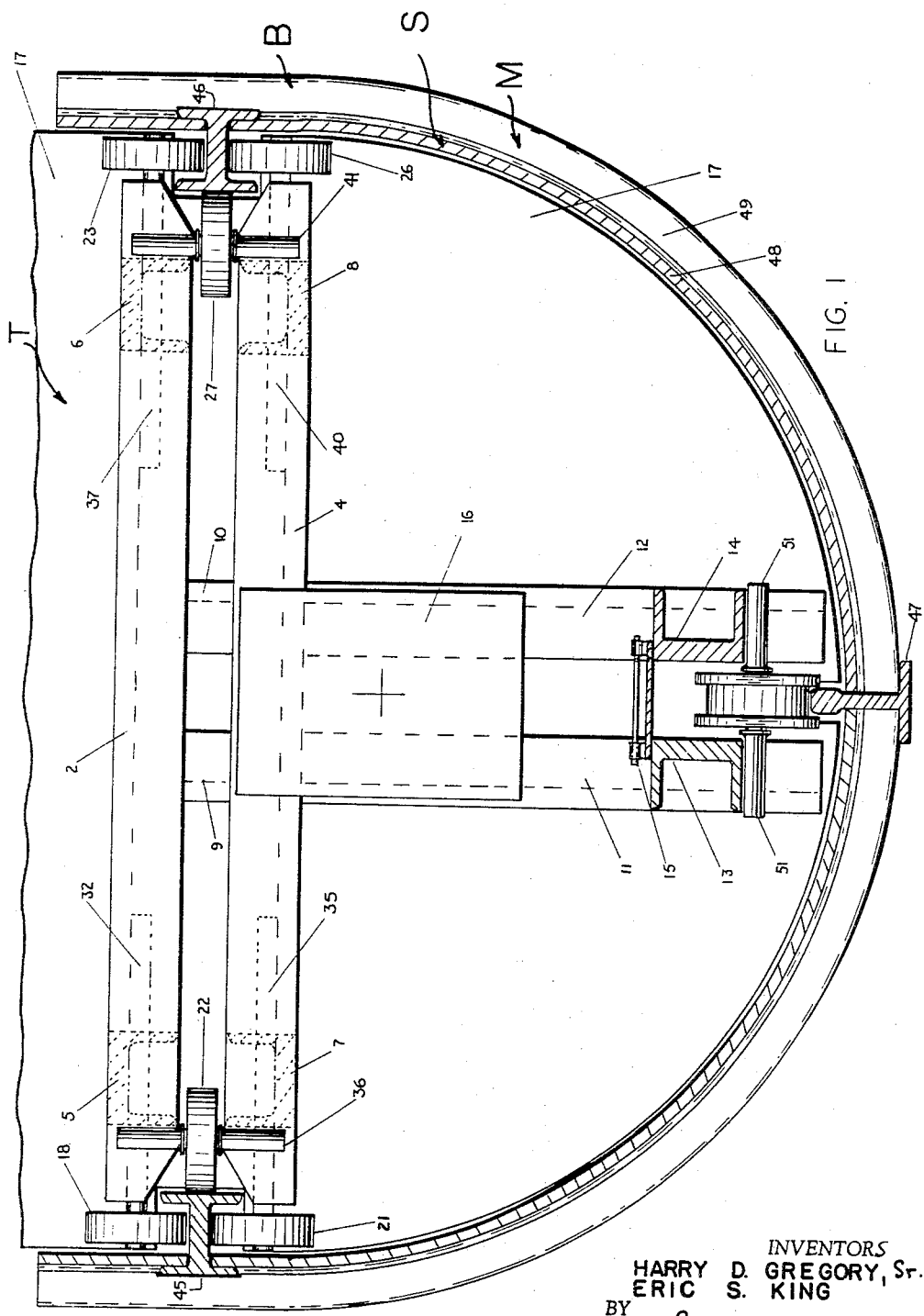
FIG. 1 is a rear elevation view looking from the front of the vehicle into the rear of the ejection gates of the open body type.

In the embodiment of FIG. 1 body B is of the open type with an open top T and a semi-circular or elliptical body shell or cover S constructed from heavy steel plate P reinforced by side frame reinforcement tubular structural steel members M or any other suitable structural arrangement.

Upper, transverse U-shaped structural gate member 1, 2 and similar lower structural members 3, 4 extend substantially the full width between the greatest upper dimension of the body B, being joined structurally and rigidly as by welding or otherwise by means of spacer members 9, 10 arranged vertically between adjacent members 2, 4 and 1, 3. Longitudinal connecting members or horizontal spacers 5 and 6 connect respective members 1 and 2 and similar spacers 7, 8 connect respective members 3 and 4.

The structural members 1, 2, 3, 4 and others mounted therewith are supported on the body B by means of vertical structural supports, box-shaped members 11, 12 having longitudinally extending U-shaped roller support members 13, 14 attached thereto with a lid and cover arrangement 15 thereover.

Mounted on the vertical members 11, 12 is a solid push-hydraulic attachment and plate 16 which receives the hydraulic mechanism to be described hereinafter.

A large semi-circular push gate 17 is mounted with and attached to as by bolting or welding or otherwise the transverse members 1, 3 and the vertical members 11, 12.

Rollers 18, 19 are mounted on the ends respectively of one end of the members 1, 3 with their axes horizontal and a center roller 20 is mounted between the members 1, 2, 3, 4 and other end roller member 21 is mounted with a horizontal axis on the end of member 4 and a roller 22 with vertical axis is mounted on members 2 and 4. Similar sets of rollers 23, 24 are mounted on the other ends of members 1, 3 and a center roller member 25 is mounted on the other side between the members 1 and 2 and it has a vertical axis. A roller member 26 is mounted on the opposite end of member 4 from roller 21. Roller 27 has a vertical axis and is mounted between members 2 and 4 on the end opposite from roller 22.

Other bottom rollers 28 and 29 are mounted between members 13 and 14 adjacent the bottom of the body B for a purpose to be described.

Members 2 and 4 are provided respectively with aligned pairs of shaft anchor blocks 30, 30A and 31, 31A welded or otherwise attached to the vertical face of the respective members. Each of the rollers 18, 19 et al. are mounted on a respective steel or other suitable material roller shaft, as follows:

Rollers 18 and 19 are mounted on respective horizontal shafts 32, 33 attached to the respective ends of members 1 and 3.

Roller 20 is mounted on a vertical roller shaft 34.

Figure 2:
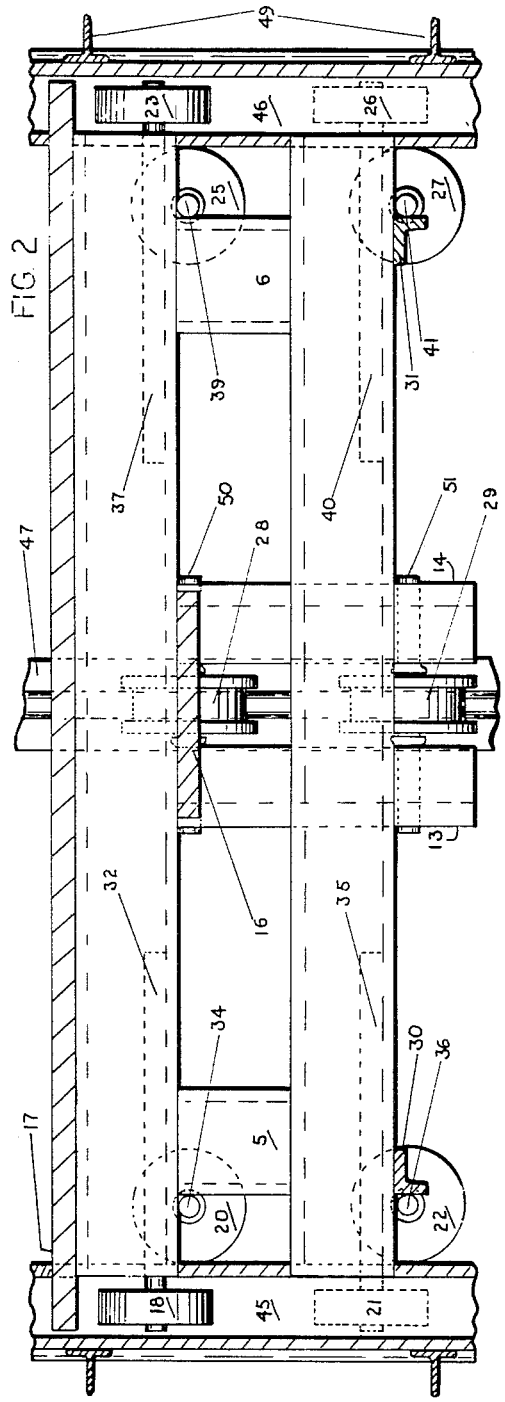
FIG. 2 is a top plan view of the gate shown in FIG. 1.
Figure 4:
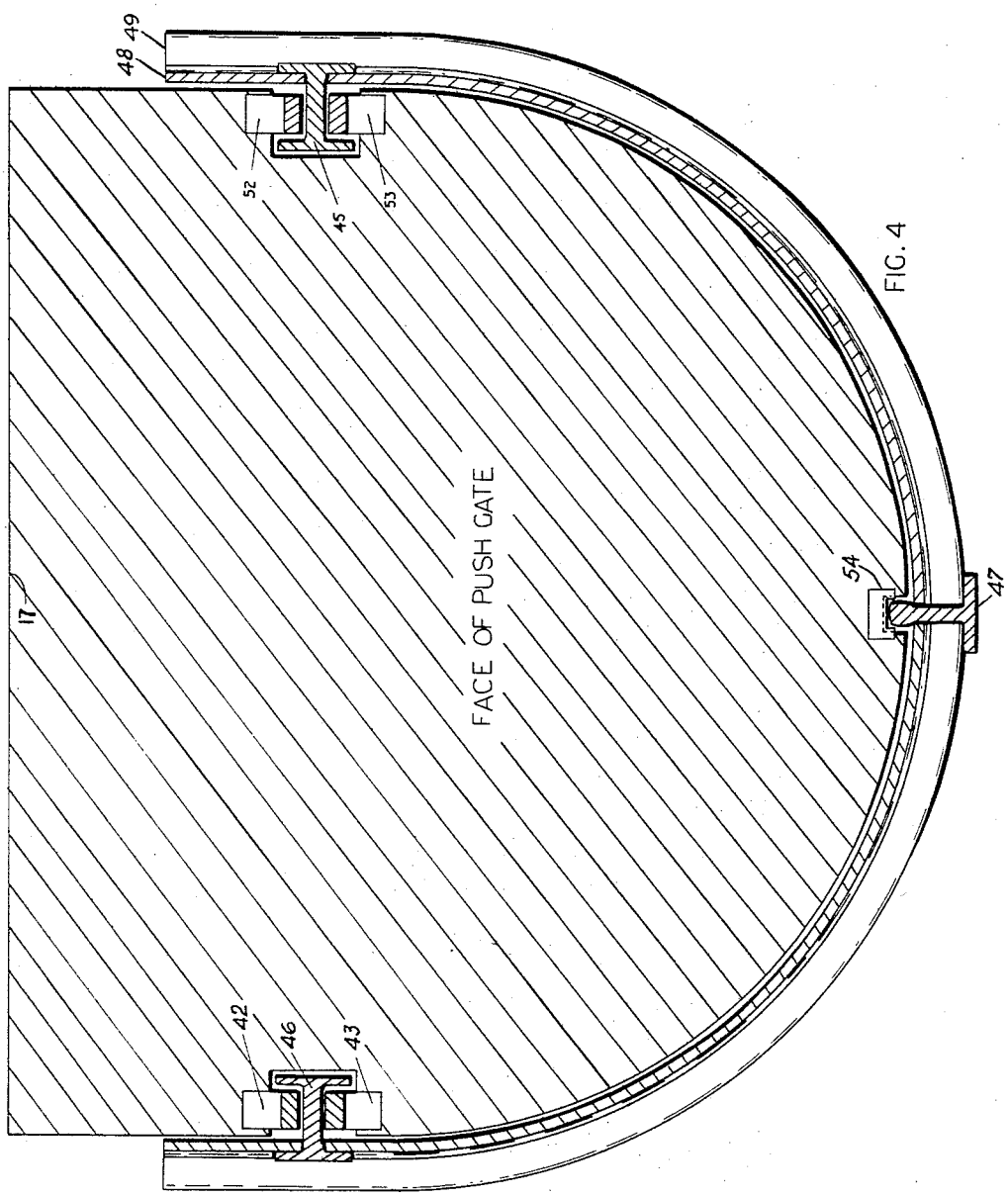
FIG. 4 is a front elevation view of the gate shown in FIG. 1 looking in the opposite direction therefrom.
Figure 5:
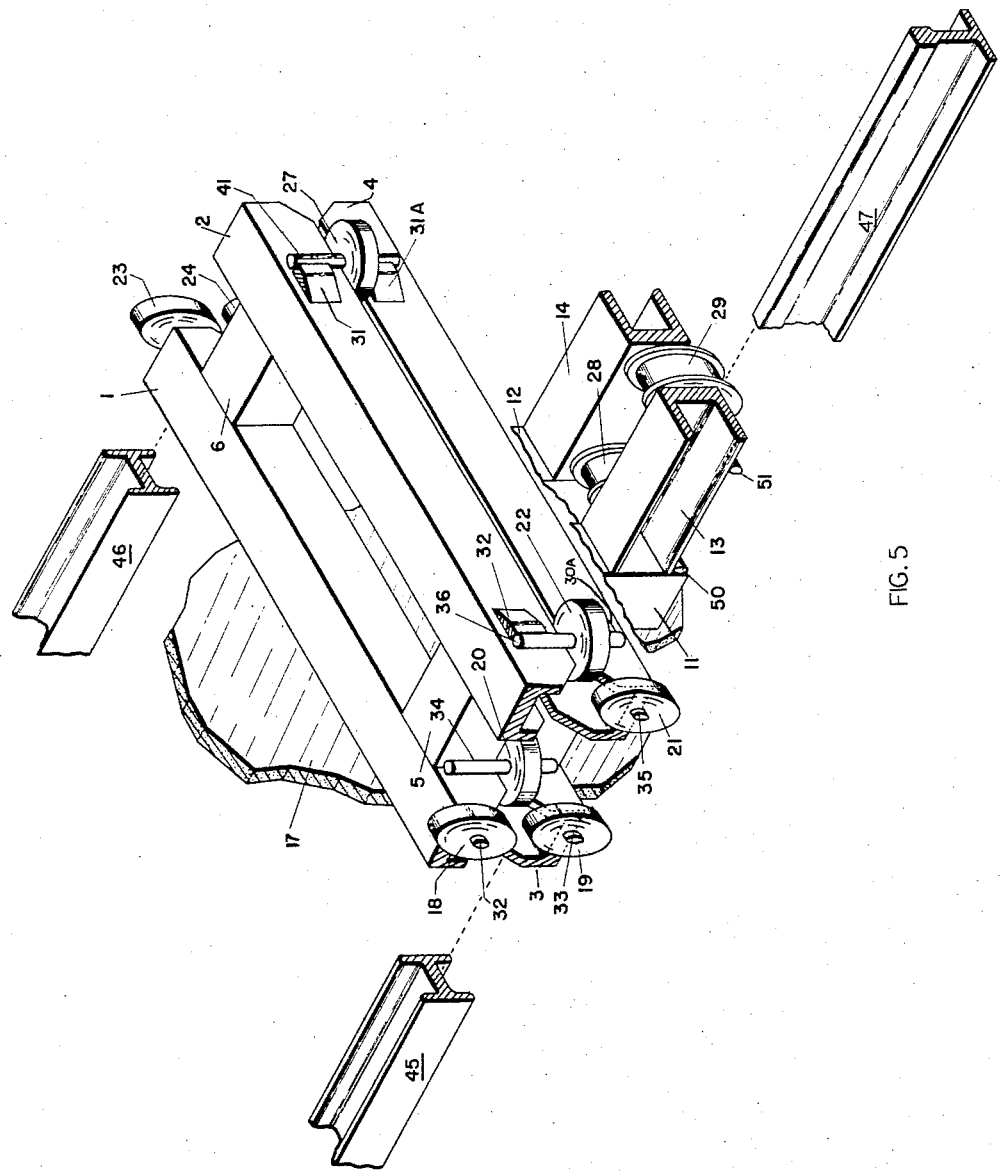
FIG. 5 is a perspective view of the gate and structural support therefor with parts and portions broken away.

Roller 21 is mounted on a horizontal roller shaft 35 attached to the end of member 4 to an extent shown in dotted lines in FIG. 2.

Rollers 23 and 24 are mounted on respective shafts 37 and 38 mounted on respective ends of members 1 and 2 and roller 26 is mounted on a horizontal shaft 40 attached to member 4.

Roller 27 is mounted on a vertical shaft 41 fitted against and attached to members 2 and 4 and to respective blocks 31, 31A.

Shaft 36 is also fitted to its respective blocks 30, 30A mounted on members 2, 4.

Attached to the front of plate 17 at the top thereof is a pair of opposed rail scraper members 42, 43 for a purpose to be described.

The entire gate 17 and the recited rollers 18, 19 et al. are adapted to be power driven longitudinally of the vehicle body B by means of a hydraulic cylinder and piston arrangement 44 comprising a plurality of telescopic cylinders 44a, 44b (as many as desired) having a piston P therein power driven by fluid pressure within the telescopic hydraulic cylinder arrangement 44 to drive the gate arrangement 17T. Cylinder 44 may be attached anywhere on the front of the vehicle and may even extend through the vehicle cab C and attached near the front thereof for the purpose of saving longitudinal space thereby to place the gate arrangement T as close to the front of the vehicle as possible giving the complete use of the open body B.

Body B and the body plate S has mounted thereon identical longitudinal rails or H beams 45, 46, there being one on each side spaced across the body and extending longitudinally thereacross. Each beam 45, 46 is turned to place the web thereof horizontally thereby providing a track on the top and the bottom in which is located on one side on beam 45 pairs of rollers 18 on the top and 19, 21 on the bottom and on the other side roller 23 on the top and rollers 24, 26 on the bottom. Additionally, rollers 22, and 27 are mounted so as to tightly abut and press against the inner surface of the inside leg 45a of the track beam 45, respectively, and inside face 46a of beam 46 by roller 27. It is to be noted that this arrangement of roller sets prevents any significant torque-movement of the gate arrangement 17T which would tend to take place about an imaginary center line drawn horizontally through the four beams 1, 2, 3, 4, caused by the force against the load, and the certain rollers also prevent any vertical displacement either upwardly or downwardly as well as preventing horizontal displacement or sidewise displacement which is against the face of the respective rollers 20, 22 and 25, 27.

Body B and the skin or metal plate S also has a central, longitudinal bottom beam 47 of inverted T-shape which may form a part of the chassis of the vehicle and which provides a track much like a railroad track on which is mounted the two rollers 28, 29 having each opposed pairs of flanges 28a and 29a which confine the top 47a of the track 47 therein. It is to be noted that these rollers 28, 29 are substantially closed and a housing formed by the opposed faces of beams 13, 14, the top inspection lid arrangement 15 and the bottom of body B plate S. The S body skin or outside covering is composed of individual plates 48 welded or otherwise connected together and reinforced by means of the structure M consisting of staves 49 which may be tubular steel frame members or other structural supports.

Rollers 28, 29 have respective roller shafts 50, 51 attached to and extending across the parallel members 13, 14 supporting the respective rollers 28, 29 on the top of the edge of 47a of rail 47. As readily seen in FIG. 3, the rail scrapers 42, 43 are positioned on both sides of the respective rails 45, 46 to scrape dirt or other debris therefrom and to keep the surfaces of the rails clean for the proper action of the respective rollers 18, 19, 20 et al. A scrapper blade or member 54 is attached to the bottom of gate 17 on top of rail 47 contacting the rail edge 47a to scrape it clean and to keep debris and other foreign matter therefrom and to prevent it from interfering with the proper operation of rollers 28, 29.

Figure 3:
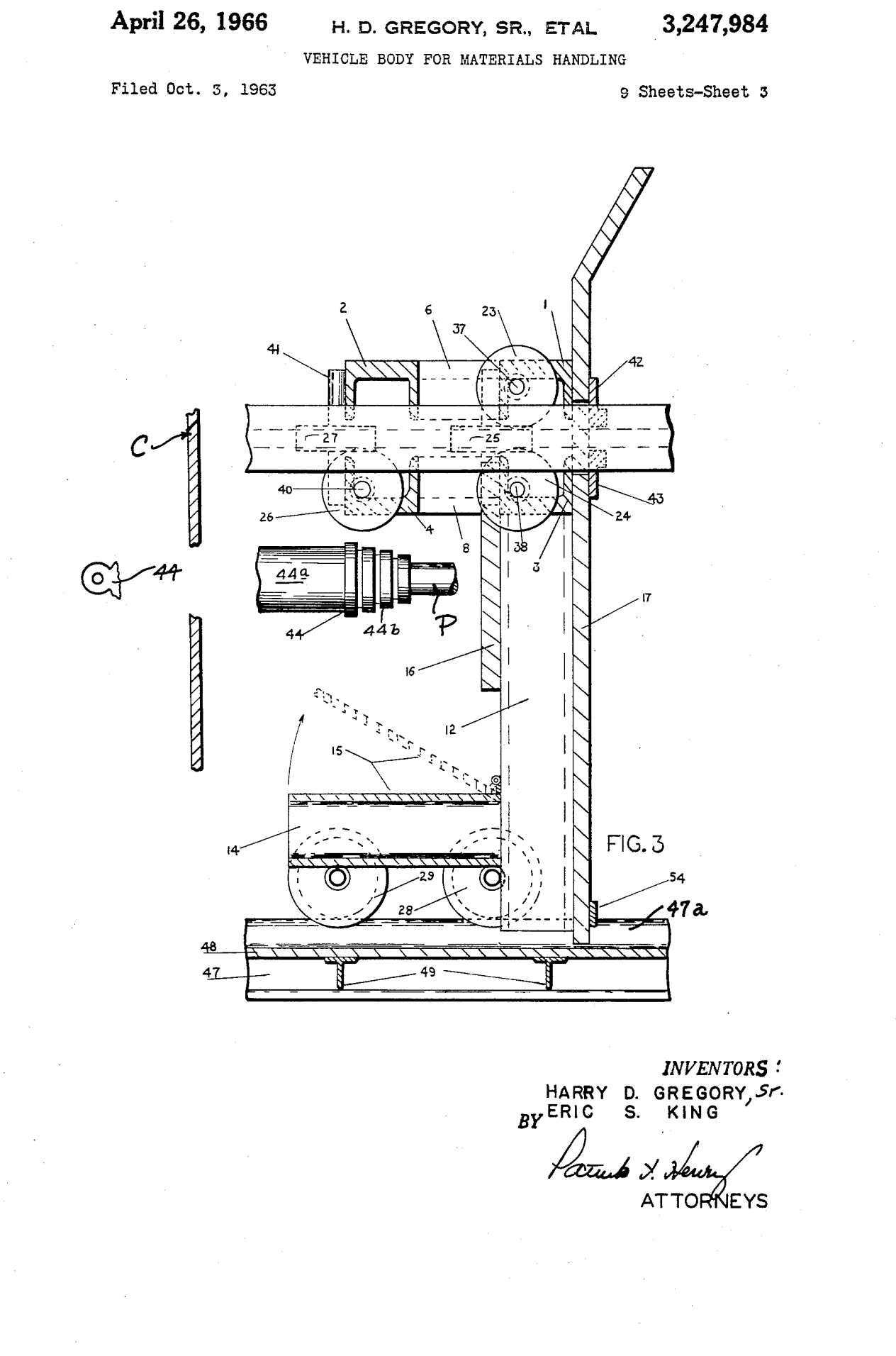

Any threatened displacement of the rollers 19, 18, 20 et al. from their position at their respective tracks 45, 46 is prevented by the arrangement and spacing of the rollers 18, 19 et al. themselves. Tendencies of the gate to tilt forward are resisted by and counteracted by rollers 21 and 26 in FIG. 1 bearing against the lower track of the side rails 45, and 46 the tendency of the top of the gate 17 to tilt to the rear (backward tilt) would be counteracted by the roller 29, shown in FIG. 3 bearing on the bottom rail 47 which is also seen in FIG. 3. In both attitudes of tilt, the side rails 45 and 46, as seen in FIG. 3, would act as the fulcrum point. Side twist or torque, would be counteracted by rollers 22 and 27 in FIG. 5. In the case of higher pressure being applied to the left front of the push gate face plate 17 (see FIG. 4) by an uneven load, the tendency of gate 17 to twist in the body would be counteracted by roller 22 in FIG. 5 bearing on the inside fringe of the side rail 45 in FIG. 5. Conversely, undue pressure on the right front of the push gate face plate would cause the roller 27 (FIG. 5), to bear on the inside of flange of side rail 46 in FIG. 5.

The side gauge rollers 20, 25 (see FIG. 2) prevent any tendency of the sides of the body to distort thereby causing the body to become narrower at any point at the distance traveled by the gate assembly T–17. Any outward bowing of the body which is seen in FIG. 1 would be controlled by the body staves 49 and the assembly S, M and adequate body plate material 48 and staves 49 which is a matter of structural design and which can be reinforced as necessary.

The operation of the device is believed to be apparent from the foregoing description in connection with the various parts. However, by way of summary, it is to be noted that the push gate 17 normally occupies a position as though it were the front end of a body B placing it immediately behind or even as part of the cab structure of the vehicle or in the case of a tractor-trailer arrangement placing it immediately behind the tractor. In this position, the entire body B is open and may be filled to capacity above the upper edge of the gate T–17 with dirt or any other debris. Upon reaching the desired unloading site, the hydraulic mechanism 44 is actuated by suitable hydraulic pumping power and control arrangement (not shown) to cause the hydraulic members 44a, 44b et al. to extend with the piston P which is attached to the point plate 16 on the gate assembly T thereby power driving the entire assembly longitudinally throughout the length of body B expelling the load from the open end of the body B as the gate T is moved. The speed at which the material is expelled may be controlled or may be stopped at any point for any period of time desired. Furthermore, the vehicle itself may be at rest, moving slowly or moving relatively fast depending upon the conditions and the material being distributed. The center of gravity of the load may be placed low through the use of the bottom rail 47 and the entire structure as part of the chassis or framework of the vehicle. The center line of the axles of the wheels may be located with respect to the center of gravity of the load in the body B as deemed to be desirable and structurally sound from the standpoint of tipping. In any event, the vehicle may be made more stable than presently existing fixed dump body trucks.

*Closed body compress type*

Figure 6:
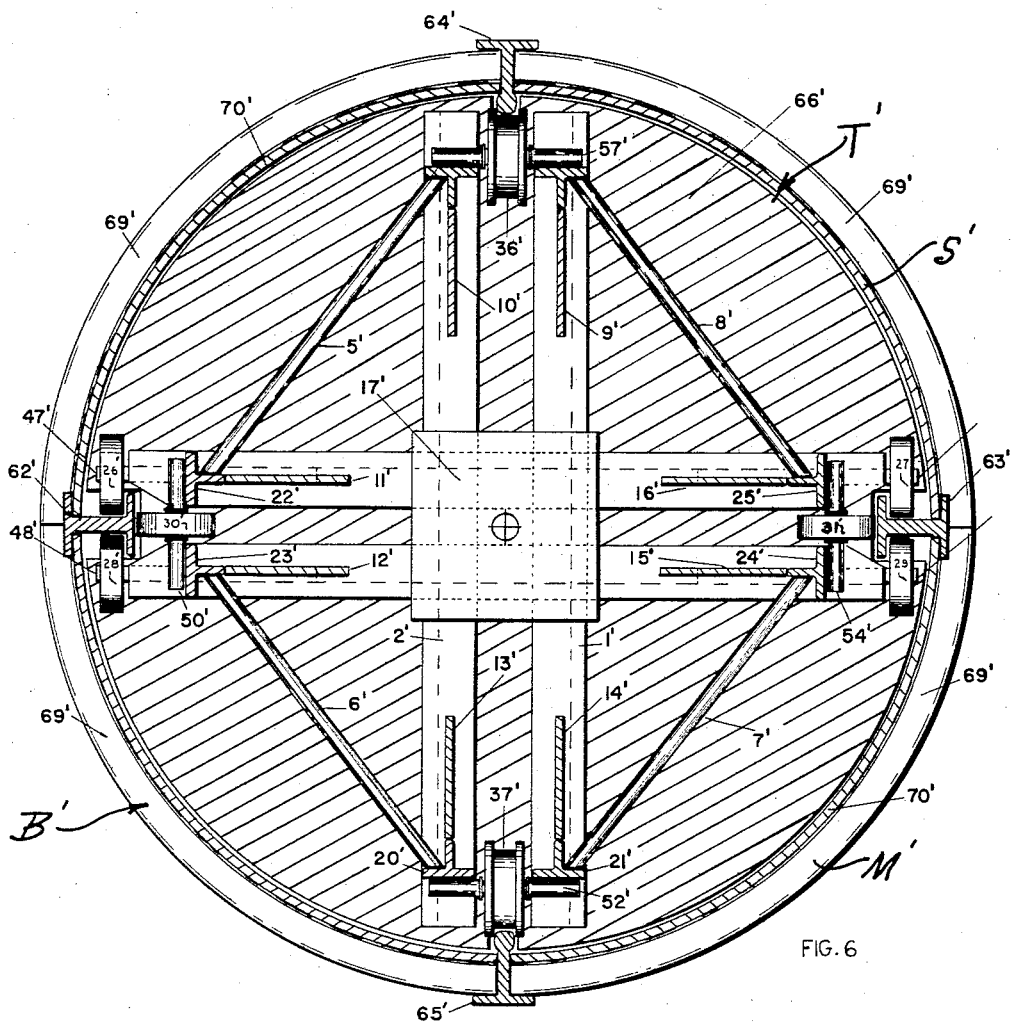
FIG. 6 is a rear elevation view of a modified form of the inventoin employing a cylindrical closed body.
Figure 7:
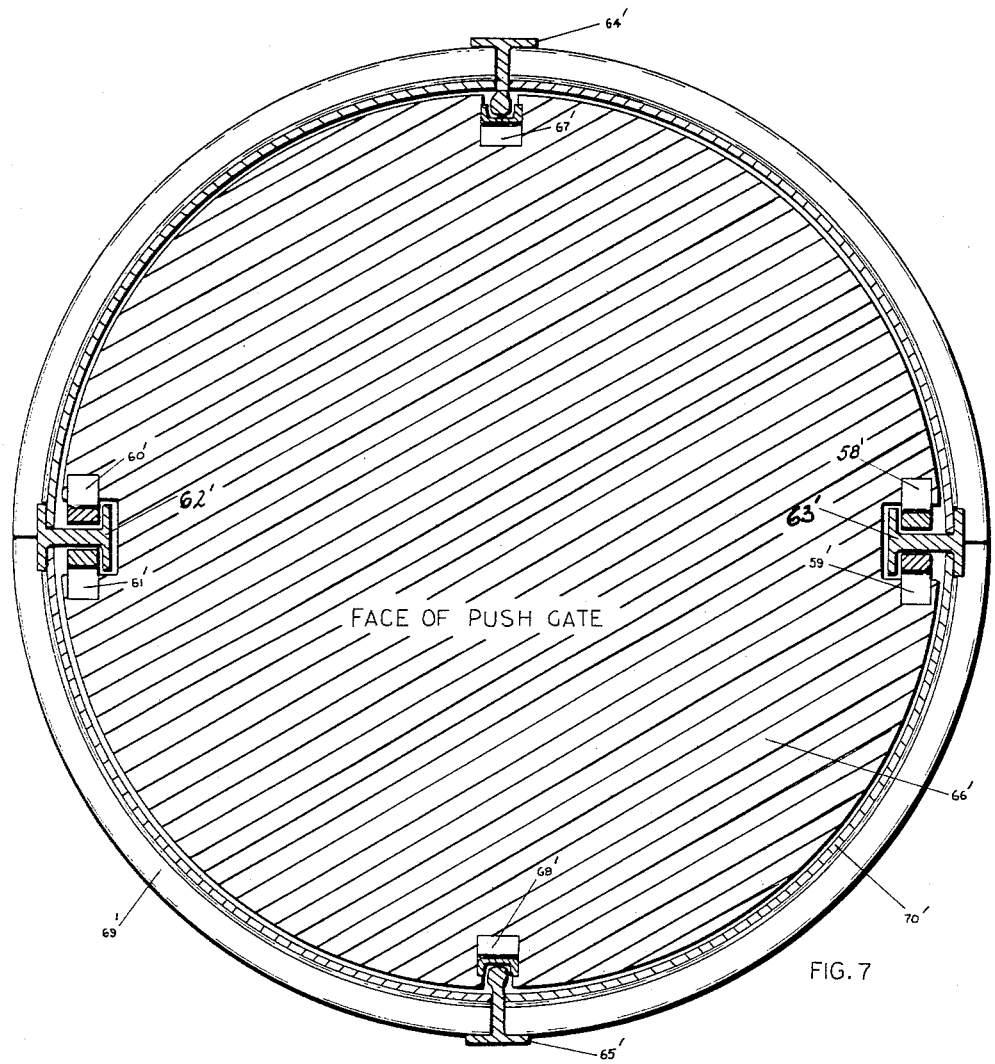
FIG. 7 is a front elevation view looking in the opposite direction from FIG. 6.
Figure 8:
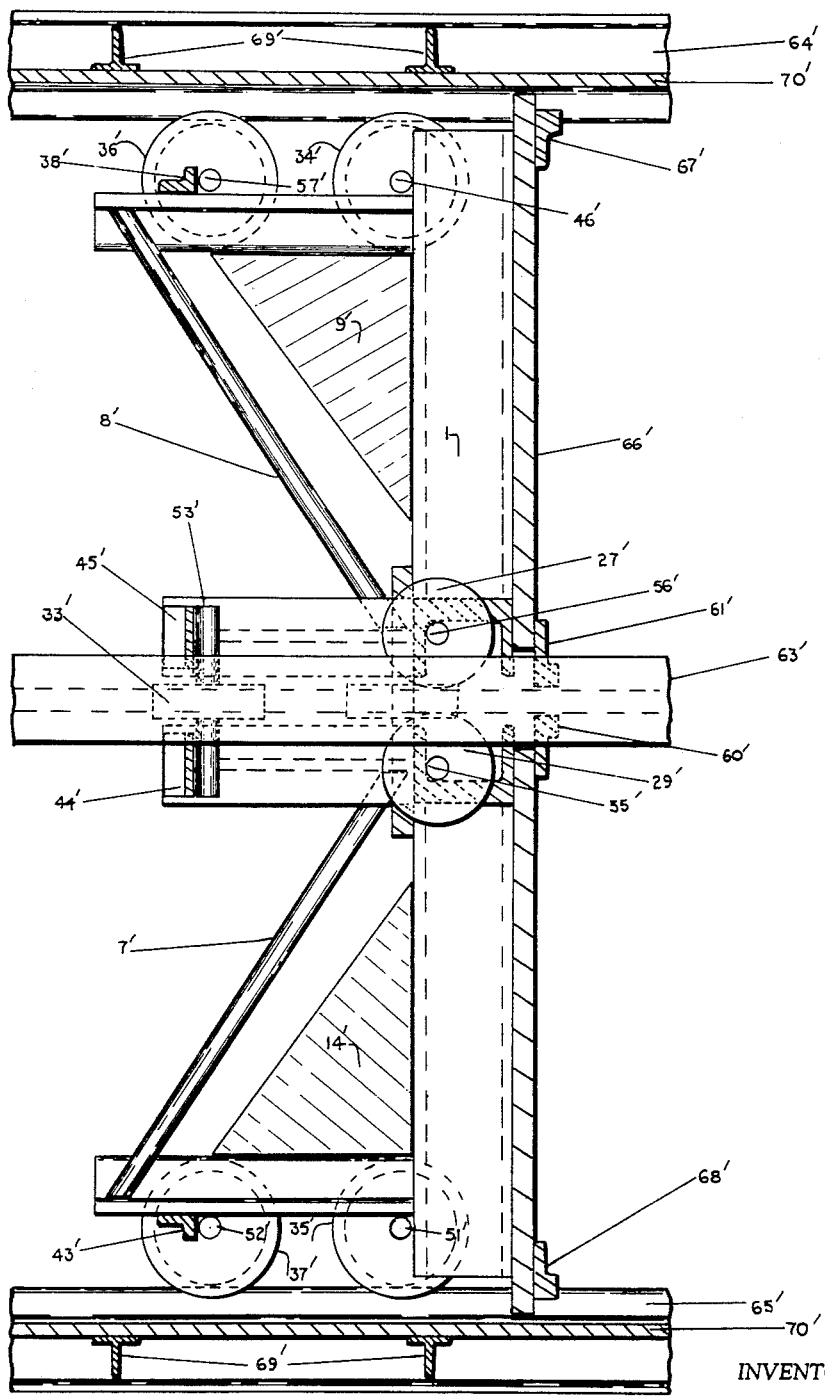
FIG. 8 is a side elevation view taken substantially along lines 8—8 in FIG. 6.
Figure 9:
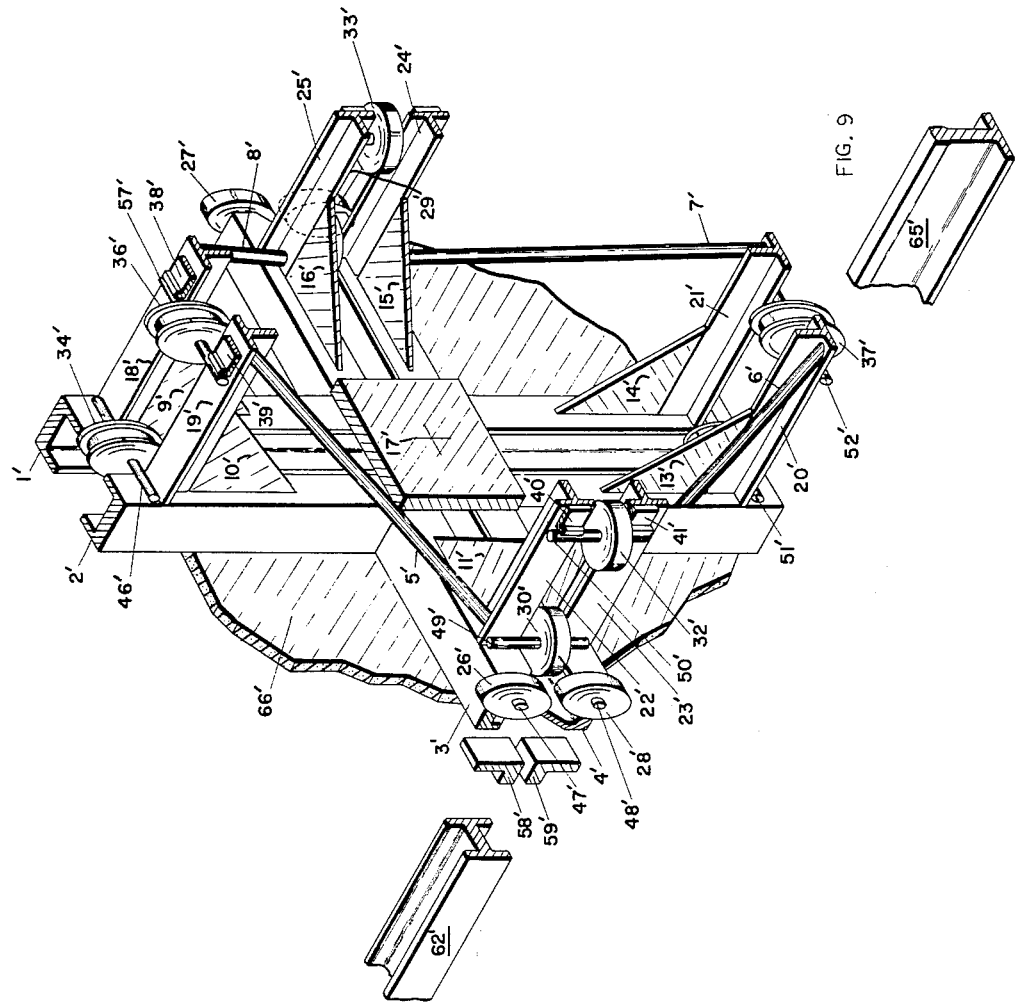
FIG. 9 is a perspective view of the gate shown in FIGS. 6 through 8 with portions thereof broken away.

As stated previously, FIGS. 6 through 9 are devoted to a modified form of the invention which is adapted to be a closed or semi-closed body construction of the sort which may be used for compressible materials such as wet and dry garbage and which like the previous embodiment employs a compression gate arrangement hydraulically operated along the length of the vehicle body but in addition to expelling a load which was placed in the previous embodiment from the top or from the rear, the present embodiment shown in FIGS. 6 et al. is adapted to use the gate in rearward extended position loading the material between the gate and the rear tailgate member and gradually compressing the load until the vehicle body is filled at which time it may be taken to the dump site, such as an incinerator pit, and the tailgate opened and the entire load expelled in one full swoop by moving the gate through the body.

In the embodiment shown in FIG. 6 et al., the compression gate arrangement T', vertical braces or beams 1', 2' forming the vertical structural support for the gate arrangement T' intersect with and are rigidly attached to, as by welding, horizontal U-shaped beams 3', 4'. Extending from opposed, spaced positions on respective horizontal beams 3', 4', on one side is a pair of struts 5', 6' extending respectively upwardly and downwardly at a diagonal. Similar struts 7', 8' extend on the other side from opposed positions on the respective beams 3', 4' respectively upwardly and downwardly.

Support brackets 9', 10' are attached to the front faces respectively of beams 1', 2' extending downwardly and aligned pairs of similar support web members or brackets 11', 12' extend inwardly attached to the front faces of beams 3', 4', and other pairs of brackets 13', 14' are substantially in line with and immediately below brackets 9', 10' on the faces of vertical members 1', 2'. Other brackets or supports 15', 16' are attached to the faces of beams 3', 4' on the opposite side from brackets 11', 12'. A push plate 17' of heavy construction is welded, bolted or otherwise securely attached to the area of the intersecting points of the beams 1', 2', 3', 4'.

Relatively short U-beam supports 18', 19' have one end attached to a respective upper end of vertical members 1', 2' and are welded along an edge of a respective support plate 9', 10'. Similar short U-beams 20', 21' are attached at one respective end to a respective face of a respective vertical beam 1', 2' at the lower end thereof and are welded or otherwise securely attached along the edge of a respective plate 13', 14' which forms a triangular web between the members 20', 21' and a vertical respective beam 1', 2'. Similar triangular web plates or brackets are formed of the supports or plate members 11', 12' between respective short I-beam members 22', 23' and likewise short I-beam members 24', 25' are attached to respective horizontal members 3', 4' by means of web plates or triangular plates previously recited 15', 16', respectively. On each end of beam 3' there is a respective top support roller 26', 27', respectively, matching with a similar roller respectively 28', 29' mounted on beam 4' therebelow. A center roller 30' is mounted between beams 3', 4' and a matching roller on the other side 31' is mounted between beams 3', 4' on that side. Spaced from and in alignment with rollers 30', 31' are on a respective side matching rollers 32', 33'. At the top between the vertical U-shaped beams 1', 2' there is a pair of longitudinally spaced rollers, a roller 34' matching with a lower roller 35' immediately therebelow on beams 1', 2' and a matching roller 36' matching with a lower roller 37' therebelow. Shaft anchor blocks 38', 39' anchor rollers 36' in place as do similar anchor blocks 40', 41' structurally attached with roller 32' and blocks 42', 43' as to roller 33' and blocks 44', 45' as to roller 37'.

Roller 26' is provided with a shaft 47' which is attached to one end of beam 3' and roller 28' is provided with a shaft 48' attached to the end of beam 4'. Rollers 27', 29' have respective shafts 49', 50' and rollers 35', 37' have respective shafts 51', 52', and roller 31' has a shaft 54' arranged vertically. Roller 29' has shaft 55' and roller 27' has shaft 56'. Roller 36' has a shaft 37' and roller 36' has shaft 57'.

Longitudinal, spaced side rails 62', 63' are spaced across the transverse width of the circular body B and are constructed of I-beam construction with the web 62'a and 63'a respectively thereof lying horizontally to provide a horizontal upper and lower track in which is mounted tightly rollers 26', 28' on one side and rollers 27', 29' on the other side on beam 63'. Rollers 30', 31' abut the inner face of the exposed inside face of respective tracks or beams 62', 63' and as in the former embodiment these rollers 30', 31' prevent unwanted motion which may take place as a result of the forces involved. Rollers 33', and 32', also act against the inner face of respective beams 62', 63' further preventing unwanted horizontal torque action about the center point. The compressor or push gate or plate is designated as to the plate member itself as 66' and in the present embodiment is of circular formation. It is obvious that the overall body, the plate 66' and other structure may be elliptical, semi-circular or semi-elliptical or other combinations of shapes including square or rectangular. The only requirement is that the plate 66' and the structure T' be capable of being moved along the length of the vehicle body.

As in the case of the previous embodiment, the rails are provided with rail scrapers, a top rail scraper 67' and a bottom rail scraper 68' the purpose of which is to keep the rails clean, at the top rail 64' which is an inverted T-shaped rail having the edge 64'a inverted and extending down and being engaged by the respective rollers 34', 36'. Lower rail 65', is an inverted T-shape rail with the inner edge 65'a extending through the semicircular plate 70' and being contacted by the roller sets 35', 37'. The body is reinforced with the body staves 69' connected to the body plate 70' in any arrangement and desired structural relationship found necessary to brace the forces involved.

Although it is believed that the operation of the device has been described adequately heretofore, by way of summary it is pointed out that the pusher plate or compressor device arrangement T' with plate 66' is normally arranged with the plane thereof substantially vertical placed by the members 1', 2', 3', 4' with respective struts 5', 6', 7', 8' and related parts such as the short T-beams 18', 19' et al. and related webs or connecting plates 9', 10' et al. This arrangement together with the roller sets provides a strong structural device which resists all sorts of torques which normally would defeat the smooth operation of the device. A hydraulic cylinder arrangement not shown and similar to the one 44', etc. described in connection with the previous embodiment, attached approximately at the center point designated on plate 17' in FIG. 9. The hydraulic cylinder arrangement (not shown) is adapted to push or pull the entire assembly along the side rail 62', 63' and top rail 64', 65' with whatever power is delivered according to the hydraulic qualifications of the hydraulic system involved. Although the entire body structure is not shown, it would be of whatever length is desired consistent with local laws regarding highway travel and would have a closed rear gate which may be removed or open and an input section preferably along the top across the skin or surface of the plate 70' into which compressible material such as wet and dry garbage may be dumped by garbage collectors. Initially, with the body substantially empty, the plate would be retracted substantially to the front of the body which is that point adjacent to the cab or towing vehicle and as garbage or material is dumped into the open section, the gate T'-66' is actuated hydralically periodically to compress the load against the rear gate. Eventually, the entire body will be filled from rear to front and the load will be jammed tightly against the face of the push gate shown in FIG. 7 whereby it is no longer possible to place garbage therein. At this time the load is transported to the dumping location, such as an incinerator pit, and after the tail gate is opened (which can be a matter of removing manually or automatically various pins holding the gate in place) the push gate T'-66' is actuated hydraulically to suddenly expell the entire load from the open end by moving the entire gate mechanism T' together with the push plate 66' and all of the structure 1', 2', 3', 4' to expel the material from the vehicle.

While we have shown and described a particular embodiment of our invention together with a suggested modified form thereof, this is for purpose of illustration and specification only and is not to be construed as any sort of restriction on our invention since various alterations, substitutions, eliminations, deviations, variations and ramifications may be made in the embodiments shown and described without departing from the scope of our invention as defined in the appended claims.

We claim:

1. In a load carrying material handling vehicle body for the purpose of receiving a load, such as dirt, at one location and transporting same to another location for speedy unloading thereat;
 (a) a vehicle body comprising a body surface having upstanding longitudinal side members and a bottom member enclosing a longitudinal area in which materials may be contained,
 (b) a structural longitudinal side track member on each side of said longitudinal body on the inside thereof and above the floor of said body and spaced thereabove and opposing each other across the inside of said body,
 (c) a longitudinal track member mounted on said bottom member substantially medially transversely of said body and extending horizontally longitudinally throughout said body, (d) a load transfer member mounted on said side track members and said bottom track members for longitudinal movement therealong,
(e) each of said longitudinal side track members having a longitudinal track surface on the top and a longitudinal track surface on the bottom thereof,
(f) laterally spaced rollers on the load transfer member mounted on and running in the respective top track surface,
(g) laterally spaced rollers on said load transfer member mounted on the respective bottom track surface and travelling thereacross,
(h) at least one roller seated on said bottom track and supporting the bottom of said load transfer member for travel thereacross,
(i) a center roller mounted substantially 90 degrees from the other rollers on one side and adapted to bear on the said track member and a similar roller on the other side of said load transfer member bearing against the side track member on that side.

2. In a vehicle body for containing and transporting materials such as compressible garbage or the like, comprising:
(a) a substantially closed longitudinal vehicle body having upstanding sides and a bottom defining materials handling substantially enclosed portion extending longitudinally,
(b) H-shaped support beams mounted in spaced relation on opposite sides of the interior of said body and substantially equi-distant from the longitudinal center line of the bottom of said body and at approximately the same height and each of said H-shaped support beams having an upper track surface and a lower track surface,
(c) a top track member mounted on said body substantially along the entire length thereof and a bottom track member mounted on said bottom member substantially in alignment with and spaced across said body from said top track member,
(d) a load compressing and expelling member of shape substantially the same shape as the inside cross section of said load carrying body and having laterally spaced rollers on each side thereof, there being top rollers mounted in the top of a respective support beam and bottom rollers mounted on the bottom of a respective support beam,
(e) other rollers on the top and bottom of said compressing and expelling member mounted respectively on the top track member and said rollers mounted on the bottom track member whereby said load expelling member is supported at the sides and the top and the bottom for motion longitudinally through said body along said side members and said top and bottom member,
(f) vertical beams reinforcing said load compressing and expelling member and horizontal beams reinforcing said load compressing and expelling member,
(g) diagonal struts extending from said horizontal beams upwardly and downwardly therefrom,
(h) attachment beams extending outwardly from said vertical beams and having said diagonal struts attached thereto at points spaced from said vertical and horizontal reinforcement beams,
(i) and reinforcement web plates attached to said vertical and horizontal beams and to said diagonal support beams,
(j) and power means on said vehicle for power driving said load compressing and expelling member throughout the length of said vehicle.

3. In a load carrying materials handling vehicle body for the purpose of receiving a load, such as dirt, at one location and transporting same to another location for speedy unloading thereat;
(a) a vehicle body comprising a body surface having upstanding longitudinal side members and a bottom member enclosing a longitudinal area in which materials may be contained,
(b) a side structural track member on each side of said longitudinal body on the inside thereof and above the floor of said body and spaced thereabove and said members opposing each other across the inside of said body and a bottom support track member extending longitudinally on the bottom of said body and extending longitudinally throughout said body,
(c) a substantially planar load transfer member mounted on said side structural track members and said bottom support track member for longitudinal movement thereon through said body,
(d) laterally spaced roller means on each side of the load expelling member mounted and running on the respective side structural track member,
(e) a roller support means on said load transfer member mounted on the bottom track support member and travelling thereacross,
(f) and other laterally spaced means on said transfer member bearing on the inner face of said side members and sliding thereagainst.

4. In a vehicle body for containing and transporting materials such as compressible garbage or the like, comprising:
(a) a substantially closed longitudinal vehicle body having a materials handling substantially enclosed portion extending longitudinally having upstanding longitudinal side members and a bottom member and having an opening through which materials such as garbage may be deposited,
(b) a pair of laterally spaced longitudinal side support track members mounted in spaced relation on opposite sides of the interior of said body,
(c) a longitudinal top support track member mounted on said body substantially along the entire length thereof and a longitudinal bottom support track member on said bottom member substantially in alignment with and spaced across said body from said top member,
(d) a load compressing and expelling member of shape substantially the same as the inside cross-section of said load carrying body and having laterally spaced supports on each side thereof and movably mounted on a respective longitudinal side support track member,
(e) other supports on the top of said compressing and expelling member mounted on the top longitudinal support track member, and supports mounted on the bottom of said load compressing and expelling member whereby said load expelling member is supported at the sides and the top and the bottom for motion longitudially through said body along said longitudinal top and bottom support track members, and said longitudinal side support track members,
(f) and power means on said vehicle engaging said expelling member for power driving said load compressing and expelling member throughout the length of said vehicle.

5. The device in claim 4 having diagonal struts extending from said side track members to the top support track member and to the bottom support track member there being attachment beams extending outwardly from said side, top and bottom support track members and having diagonal struts attached thereto, 6. The device in claim 5 wherein there are also: vertical beams reinforcing said load expelling member.

7. In a vehicle body for containing and transporting materials such as compressible garbage or the like, comprising:
(a) a substantially closed longitudinal vehicle body having a materials handling substantially enclosed portion having longitudinal upstanding side members and a bottom extending longitudinally; and having a top with an opening through which materials such as garbage may be deposited, (b) a pair of laterally spaced side support beams mounted in spaced relation on the interior of the opposite side members of the interior of said body each having a top and bottom guide surface, (c) a top track member mounted on said body substantially along the entire length thereof and a bottom track member substantially in alignment with and spaced across said body from said top track member, (d) a solid load compressing and expelling member of planar shape substantially the same as the inside cross-section of said load carrying body and having laterally spaced guide means on each side thereof, there being a top guide mounted on the top guide surface of a respective side support beam and a bottom guide means mounted on the bottom surface of a respective side support beam, (e) other guide means on the top of said compressing and expelling member mounted on the top track, and guides mounted on the bottom track member whereby said load expelling and compressing member is laterally supported on the sides and supported on the bottom for motion longitudinally through said body along said side support beams and said top and bottom trade members, and is thereby prevented from unwanted side play or top or bottom movement, and (f) power means for power driving said load expelling member.

8. The device in claim 7 wherein there are vertical beams reinforcing said load compressing and expelling member and horizontal beams reinforcing said load compressing and expelling member, (g) diagonal struts extending from said horizontal beams upwardly and downwardly therefrom, and (h) attachment beams extending outwardly from said vertical beams and having said diagonal struts attached thereto at points spaced from said vertical and horizontal reinforcement beams.

References Cited by the Examiner

UNITED STATES PATENTS

| | | | |
|---|---|---|---|
| 1,856,441 | 5/1932 | Standfuss | 214—82 |
| 2,047,602 | 7/1936 | Tomlinson | 214—82 |
| 2,889,944 | 6/1959 | Clark et al. | 214—82 |
| 3,148,786 | 9/1964 | Boeck et al. | 214—82 |

GERALD M. FORLENZA, *Primary Examiner.*

HUGO O. SCHULZ, *Examiner.*